Aug. 19, 1969  J. R. CURRAN  3,461,736
ELECTROMECHANICAL ACTUATOR
Filed Feb. 10, 1967  3 Sheets-Sheet 2
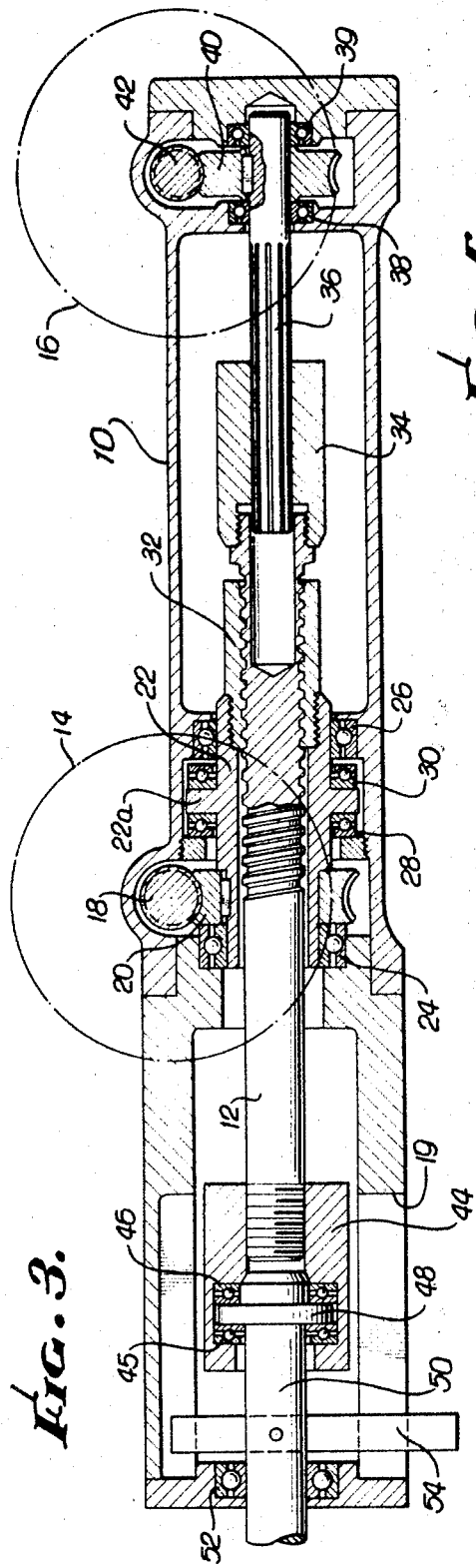
FIG. 3.
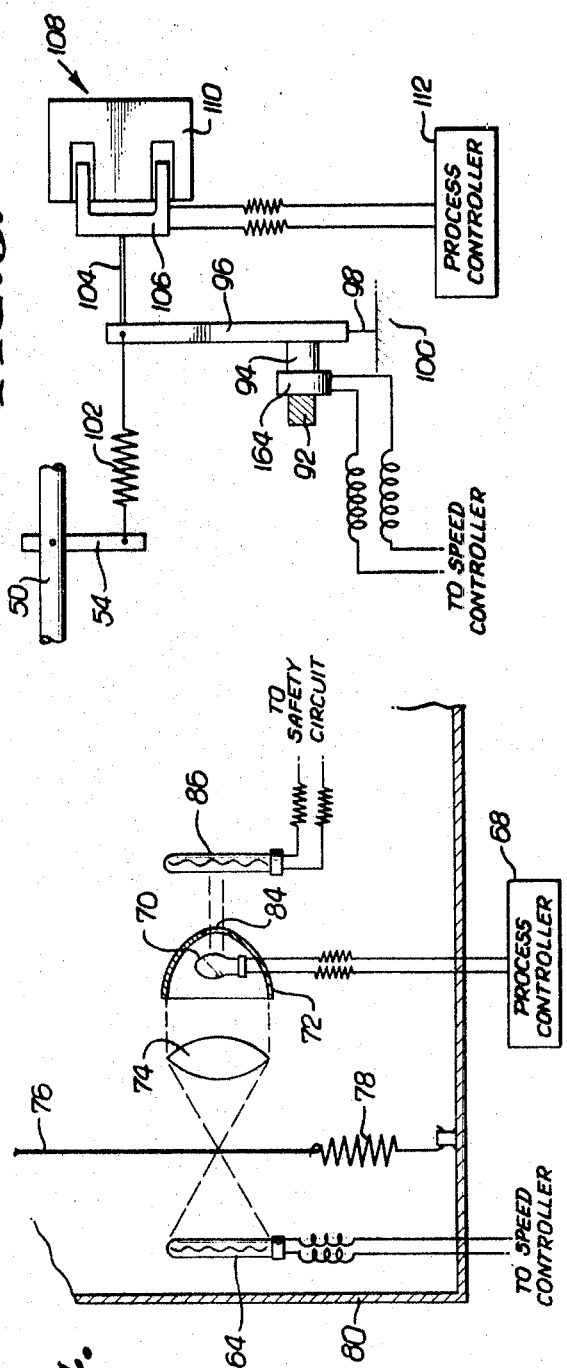
FIG. 5.
FIG. 4.
INVENTOR.
JOHN R. CURRAN
By Parker Hemminger
ATTORNEY.

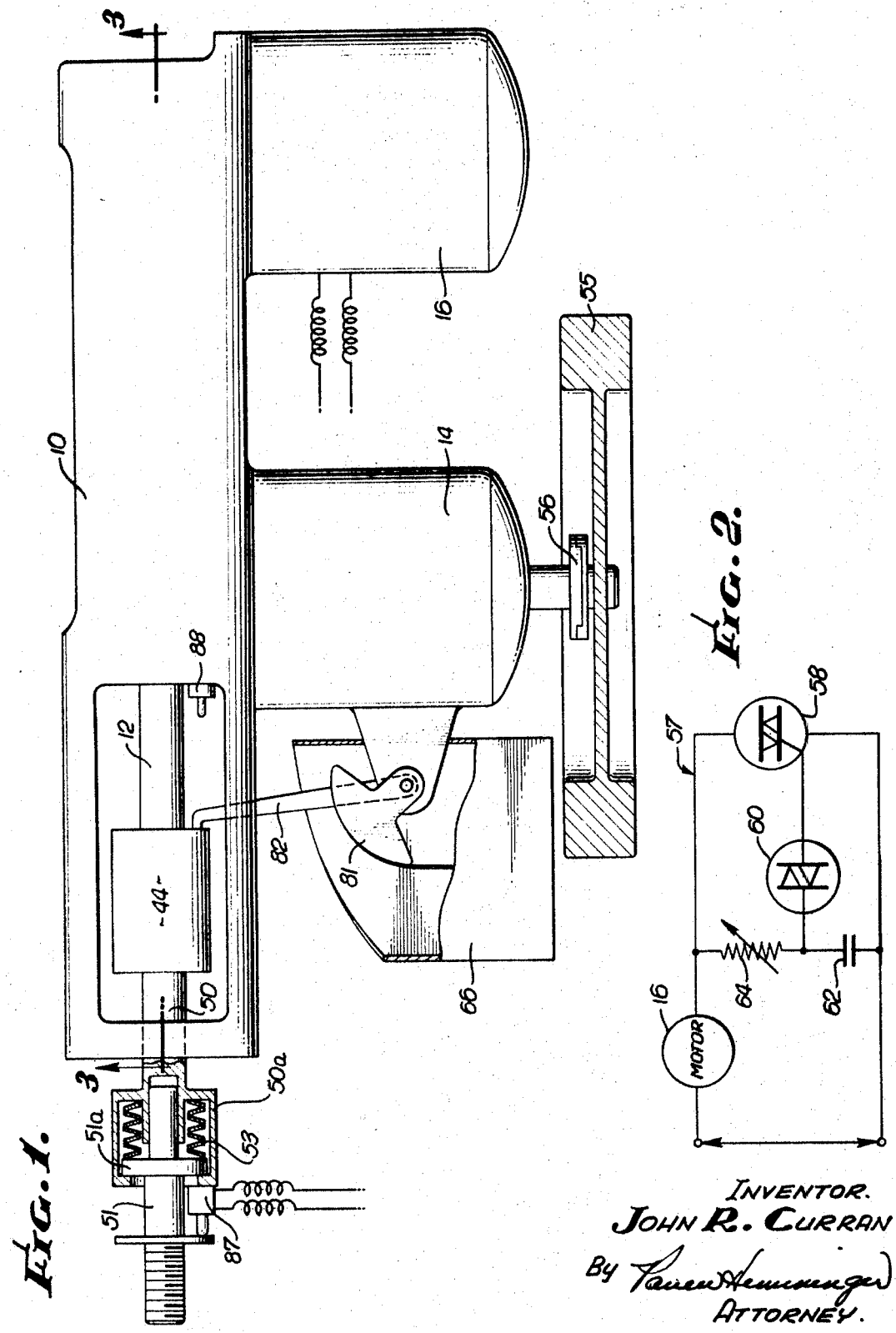

Aug. 19, 1969    J. R. CURRAN    3,461,736
ELECTROMECHANICAL ACTUATOR
Filed Feb. 10, 1967    3 Sheets-Sheet 3

INVENTOR.
JOHN R. CURRAN
By Pauew Henninger
ATTORNEY.

United States Patent Office 3,461,736
Patented Aug. 19, 1969

3,461,736
ELECTROMECHANICAL ACTUATOR
John R. Curran, Foxboro, Mass., assignor to International Telephone and Telegraph Corporation, New York, N.Y., a corporation of Maryland
Filed Feb. 10, 1967, Ser. No. 615,169
Int. Cl. F16h 1/20
U.S. Cl. 74—424.8                     2 Claims

ABSTRACT OF THE DISCLOSURE

A shaft to be controllably positioned in a direction along its long dimension is threaded for being received within a similarly threaded nut driven at a constant rotative speed. A selectively variable speed drive is also connected to the shaft. When the variable speed drive is at the same speed as the constant speed of the nut, the shaft is maintained at a fixed longitudinal orientation, whereas change of the variable speed drive effects shaft displacement. Photoconductive elements are incorporated in the variable speed drive circuitry for providing automatic control.

Actuator mechanisms and controls

This invention relates to actuator apparatus and controls therefor, and more particularly, to an improved electromechanical type actuator and improved control mechanisms which are applicable to such actuators and to actuators driven by fluid means as well.

The majority of actuator mechanisms employed to drive large valves, dampers or other controlling elements are fluid driven. One of the reasons for this is that the totally electric actuators available have not been able to economically and practically provide the necessary power. One known type of electrically driven actuator utilizes standard high speed reversible electric motors which are controlled by contactors or solid state phase shifting devices. Rapid and continuous reversal in the direction of operation has resulted in very low life to such apparatus. Another approach which has been followed in some instances utilizes a very slow speed, very high torque reversible motor directly connected to a mechanical assembly for driving an actuator shaft. While this type of motor operates satisfactorily, it is inherently high in cost and limited to small sizes.

Another reason that electrically driven actuators have not been widely employed in the past is that most process control signal devices used in connection with the process controlled by the actuator were fluid operated. Consequently, the availability of pressurized fluid encouraged the use of fluid driven actuators. However, electrically powered measuring instruments and signalling devices are being more widely utilized; and consequently, the lack of an existing source of pressurized fluid makes the fluid driven actuators less desirable and, correspondingly, the electric actuator more competitive.

It is a primary object of this invention to provide a unique electrically driven mechanical actuator, which is low cost, highly reliable, employs standard components, and can be fabricated in the sizes desired.

It is a further object of this invention to provide such actuator mechanism wherein relatively low torque high speed motors may be employed to provide instantly available high actuating forces in either of two directions.

It is another object of this invention to provide a unique photoelectric control mechanism for operating such actuators as well as fluid driven actuators.

It is yet another object of this invention to provide such control mechanisms wherein milliamp signals from process control equipment are uniquely amplified to be utilized for controlling the operation of an actuator or other device.

In accordance with one aspect of this invention, there is provided an electromechanical actuator mechanism employing a constant speed electric drive means rotating an axially fixed nut in one direction. A rotatable and axially movable actuator output shaft having an externally threaded portion received in the nut is moved in one direction on rotation of the nut. A second axially fixed shaft is connected to rotate the output shaft while permitting axial movement of the output shaft. A variable speed drive means is connected to rotate the second shaft in the same direction as the nut, whereby the actuator output shaft is maintained in a given axial position by rotating the second shaft at the same time as the nut. However, the output shaft may be moved in either axial direction by varying the rotational rate of the variable speed drive means so that the second shaft is rotated at a rate faster or slower than the rotation rate of the nut. Since the motors are constantly in operation, considerable torque is instantly available from relatively small electric motors which may be used as the drive means.

A solid state control circuit for controlling the power applied to the variable speed drive means includes a variable resistance in the form of a photo-electrical cell and a unique optical system which causes the resistance of the cell to be a function of a low power signalling device. Through a feed-back arrangement, the cell resistance is also a function of the actuator position and thus modulating control is attained. In one arrangement, a signal from a process control device is used to energize a light source which in turn illuminates the photocell. In another arrangement, the light source is energized by a constant supply and the amount of light striking the photocell is controlled by mechanism energized by a signal from a process control device. With these arrangements, the signal from the process control device is effectively amplified.

In yet another embodiment of the invention, the variable resistance required in the solid state control circuit is obtained by employing a cell which changes its resistance when subjected to pressure; and the amount of pressure applied is controlled by an electromechanical arrangement energized by a process controller.

Further features, objects and attendant advantages of the invention will become apparent with reference to the following detailed description and drawings in which:

FIG. 1 is a partially diagrammatic view of the overall apparatus of the invention;

FIG. 2 is a diagram of the circuit employed to control the speed of the variable speed drive means of FIG. 1;

FIG. 3 is a cross sectional view on 3—3 of FIG. 1;

FIG. 4 is a diagrammatic showing of a system for varying the resistance in the control circuit in accordance with a signalling device and the position of the actuator shaft;

FIG. 5 is a diagrammatic showing of another arrangement for varying the resistance in the control circuit of FIG. 2;

Electromechanical actuator

Figure 6:
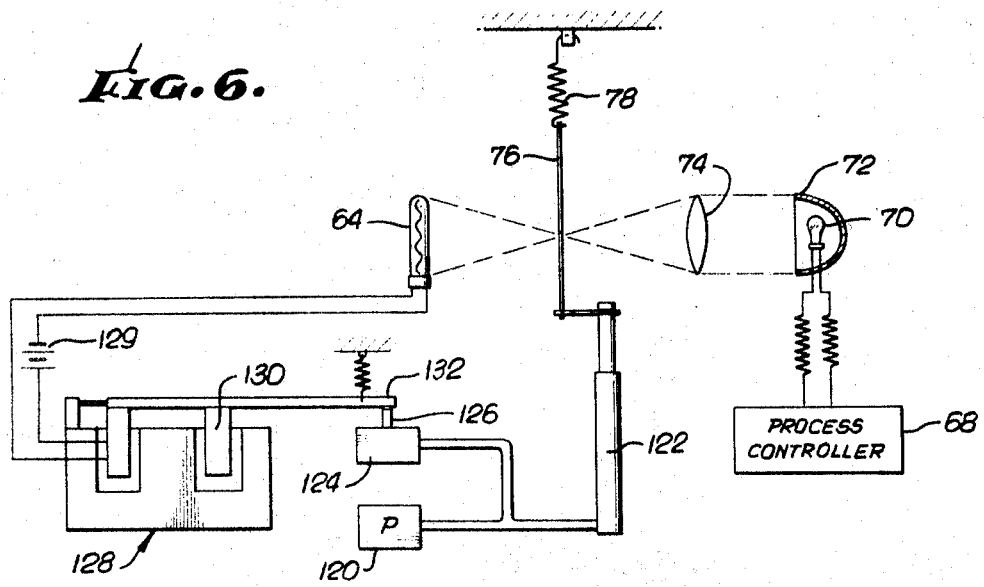
FIG. 6 shows a diagram applying the system of FIG. 4 to an electrohydraulic type actuator.

Referring now to FIGS. 1 and 3, the unique electromechanical actuator mechanism of the invention may be seen to include an actuator housing 10, a main actuator shaft 12 and a pair of electric drive means 14 and 16, such as rotary motors. Motor 14 rotates a single thread worm 18 at a constant speed and the worm drives a worm gear 20 at a desired reduced speed. Worm gear 20 is in turn suitably attached to an annular member 22 mounted for rotation in housing 10 by suitable bearings 24 and 26. A flange 22a formed on member 22 is mounted between suitable thrust bearings 28 and 30 which axially fix the member within the housing. The right end of member 22, as viewed in FIG. 3, is threadably connected to an enlarged nut 32 having internal threads which mate with similar threads formed on the exterior of shaft 12. The arrangement of nut 32 and the mating thread on shaft 12 is often referred to as a Saginaw ball bearing nut and screw.

If shaft 12 is not rotating, the rotation of nut 32 will cause shaft 12 to move either to the left or to the right depending upon the direction of rotation of the motor 14 and nut 32. However, in accordance with the invention, the right end of the shaft 12 is connected by suitable threads to a spline assembly including a spline collar or nut 34 having axially extending grooves or splines through a central passage and through which extends a spline stub shaft 36 which cooperates with the collar 34 to cause the collar 34 and shaft 36 to rotate as a unit but to permit relative axial movement between the two elements. As can be seen, spline shaft 36 is mounted on its opposite end by suitable bearings 38 and 39 in the right end of housing 10. A worm gear 40 is suitably connected to rotate shaft 36 and the gear is in turn rotated by worm 42 connected to motor 16.

Spline shaft 36 is normally driven by motor 16 in the same direction as nut 32 and at the same speed, with the result that actuator shaft 12 remains stationary with respect to nut 32 and does not move axially. However, in accordance with the invention, motor 16 is designed to operate at variable speeds and hence by increasing or decreasing the speed of motor 16, shaft 36 is made to rotate at a faster or slower rate than nut 32 so that output shaft 12 is moved in either direction, as desired, by nut 32.

A principal advantage of an actuator mechanism of the foregoing type is that since the motors are constantly operating at relatively high speed, considerable torque and hence actuator force may be instantaneously obtained with relatively low power motors in that efficiency is greater at high speed. No time is lost waiting for motors to come up to speed and there are no torque requirements at slow speeds. For example, when employing motors having only 1/12 horsepower rating at speeds of approximately 1630 r.p.m., an actuator output force of approximately 1,000 lbs. may be obtained. Such force would satisfactorily drive most control valves in size 1/2 to 4 inches in diameter. Faster and much larger models are just as practical. Also, the approach of a rotating nut for moving a shaft is quite efficient and the use of a single thread worm and worm gear between the nut and the motor prevents the actuator from "overhauling" or "overshooting" its stopping point.

The differential screw actuator described is highly reliable and inexpensive in that practically all components are mass produced and commercially available. In this regard, a variable speed eddy current device or other drive means may be employed instead of the variable speed motor 16. Both motors are driven in one direction at high enough speeds to insure adequate cooling and absence of bearing problems. The unit may be completely sealed so that lubrication need be provided only once every several years.

It is desirable that the ultimate output member of the actuator move only in an axial direction and not rotate and, accordingly, means are provided to accomplish such result. More particularly, the thrust bearing support member 44 is threadably secured to the left end of shaft 12 and carries internally a pair of suitable thrust bearings 45 and 46 disposed on opposite sides of a flange 48 formed on an output shaft 50. Shaft 50 is also mounted within housing 10 by a suitable bearing 52. A transverse element 54 is attached to shaft 50 and rides within slots 19 formed in housing 10. Accordingly, element 54 prevents rotation of shaft 50 while member 44 attached to shaft 12 rotates around flange 48 attached to shaft 50.

Shaft 50 may be directly connected to the device to be controlled by the actuator or is optionally connected to another shaft 51 through an axially flexible connection to prevent damage to the system in the event of a malfunction. As seen in FIG. 1, the end of shaft 50 is formed with a hollow enlargement 50a in which is captured a flange 51a on shaft 51. An axially flexible spring element 53, such as a Belleville washer, extends between flange 51a and the inner end of enlargement 50a so that if the axial force exceeds a given level, shaft 51 can move relative to shaft 50. The outer end of shaft 51 is threaded to facilitate connection with a device to be controlled by the actuator.

For those applications in which the actuator is expected to provide both a push and pull force of comparable magnitude, it is contemplated that the motors 14 and 16 have similar power ratings. However, in certain applications, it is only necessary that the actuator provide force in one direction in that a spring or other means may provide force in the opposite direction. Accordingly, in such situations, only one of the motors such as constant speed motor 14, need provide force adequate to overcome the spring force while the variable speed motor may have a considerably smaller power rating, and hence be less expensive.

Flywheel

In many applications, it is desirable that an actuator automatically return to an end position upon a power failure. This can be accomplished by means of a spring; however, with such arrangement it is necessary to overcome the force of the spring during operation of the actuator. As another aspect of the present invention, there is provided a flywheel 55 illustrated in FIG. 1 which is driven through a friction clutch 56 by motor 14. The clutch 56 functions to prevent significant drag on motor 14 until it is up to speed with little difficulty. Once reaching operating speed, the flywheel may be maintained in rotation with little additional power. If a power interruption should occur, the momentum of the flywheel 55 will cause the output shaft of motor 14 to continue to rotate while the output shaft of motor 16 will stop relatively quickly with the result that the actuator will be moved to one extreme position as desired.

Motor speed control

Since the operation of the actuator mechanism is determined by the operating speed of the variable speed motor 16, it is, of course, necessary that a suitable control be provided for determining the speed of motor 16. For this purpose, a known solid state control circuit 57 may be employed of the type illustrated in FIG. 2. Such circuit illustrates the variable speed motor 16 connected to a source of power in series with a symmetrical AC switching device such as a Triac, which is capable of conducting considerable current. The Triac 58 will not conduct any current however, until a suitable bias voltage has been applied to it and for this purpose, there is provided a symmetrical AC trigger diode 60 which is connected to a parallel conducting leg containing a capacitor 62 and a variable resistance 64. By varying the resistance of the variable resistor 64, the trigger diode 60 may be caused to conduct or not to conduct, as desired, which in turn controls the conduction of current through Triac 58. The adjustable controlling element of the control circuit 57 thus becomes the variable resistor 64. While the resistor may be manually controlled, it is contemplated that it will normally be controlled by one or more signals received from process control equipment and from feedback mechanism linked to the actuator.

In accordance with a further aspect of the invention several unique arrangements are provided for varying the control resistor 64 automatically in accordance with such signals. Such an arrangement is generally indicated by the numeral 66 in FIG. 1 and is diagrammatically shown in greater detail in FIG. 4 as including a photo conductive cell which serves as the variable resistance of the control circuit 57. Accordingly, this cell is identified by the numeral 64, the same as the resistor in the control circuit of FIG. 2, it being understood that the cell forms the control resistance. Typically, an actuator of the type described herein is employed to control a valve or damper which in turn controls some function within an operation or process and it is desirable that the valve be moved in accordance with certain measurements in the process. Such measurements are frequently made by electronic measuring instruments or process controls which produce low energy analog signals.

For example, a typical instrument of this nature produces a 5 to 20 milliamp signal through 200 ohms resistance. In FIG. 4 such a control instrument is schematically illustrated by block 68 labelled a process controller, it being understood that the exact nature of the device does not form a part of this invention. The signal produced by the process controller is employed to energize a small electric bulb 70 which is positioned within a parabolic reflector 72 which collimates the rays through a lens 74 that focuses the light onto the photo cell 64. As the signal from the process controller varies in strength, the light output in lumens from the bulb 70 will vary, with the result that the amount of light striking photo cell 64 will fluctuate causing changes in the resistance of the cell. The electrical resistance of the cell is inversely proportional to the value of the milliamp signal. Consequently, by suitably selecting the components, a given resistance for cell 64 will cause diode 60 to trigger conduction through Triac 58 to thus energize motor 16 and move the actuator shaft 12. Thus, the small signal from the control instrument is effectively amplified by the system to provide a high power signal used to energize the motor.

It is also desirable that the corrective action of the actuator be fed back to the speed control mechanism so that the actuator will stop its travel when the error has been corrected. For this purpose, there is provided a section of film 76 which extends between lens 74 and cell 64. In accordance with the invention, the film 76 has a variable optical density extending from top to bottom so that by moving the film in a vertical direction as indicated in FIG. 4 the light striking cell 64 must pass through sections of the film having different optical density. Consequently, the amount of light striking the cell may be controlled by such film. The lower end of film 76 is attached by a suitable spring 78 to enclosure 80 while the upper end of the film is secured to a crank 81 shown in FIG. 1 as being pivotally mounted to a bracket attached to motor 14. Crank 81 is in turn linked to a lever 82 which cooperates with member 44 attached to actuator shaft 12. As can be seen from FIG. 1, in conjunction with FIG. 4, spring 78 causes lever 82 to follow the movement of member 44. Accordingly, as the actuator shaft 12 and member 44 move axially, film 76 moves vertically thereby controlling the amount of light striking cell 64.

Since such a control arrangement is light sensitive, the enclosure 80 is, of course, made to be light tight so that the surrounding light does not affect the operation of the control circuit. As a safety device, a small hole 84 is formed in the parabolic reflector 72 to permit a small amount of light to strike an additional photo conductive cell 86 connected to a safety circuit. The safety circuit may be designed such that if the lamp 70 should fail completely, the resulting change in resistance of cell 86 is used to trigger an alarm or to shut off power to the actuator.

It should be noted that with the control system described, stepless modulation and reversal of the driven shaft is accomplished without any switching mechanisms except for that of the Triac 58 and control diode 60 which are adapted to tolerate repeated switching operations. Also such components are readily available in the current market.

As a further minor feature of the arrangement, potentiometer type limit switches 87 and 88 are mounted on the actuator apparatus as force limiting means to provide a signal to the control circuit that the end of the stroke has been reached. The leads to the potentiometer switches 87 and 88 are serially connected with the variable resistance 64 in the control circuit. In FIG. 1, switch 87 is shown positioned between flange 51b and in end of enlargement 50a, while switch 88 is located to cooperate with member 44.

FIG. 5 embodiment

In accordance with a further embodiment of the invention, there is disclosed in FIG. 5 an alternate arrangement for varying the resistance 64 in the speed control circuit 57. Instead of utilizing a photo conductive cell, the variable resistance element employed is a piezo resistive cell 164 which changes its resistance as pressure is applied thereto. It should be understood that the leads illustrated in FIG. 5 are to be connected to the speed control circuit to replace resistance 64 shown in FIG. 2. The piezo resistive cell is shown positioned between a fixed support 92 and a lug 94 attached to a lever 96 which is mounted by a spring member 98 to a fixed support 100. The upper end of the lever 96 is attached by a spring 102 to the element 54 attached to actuator output shaft 50. Opposing the spring 102 and also attached to the upper end of lever 96 is a rod 104 carrying an armature 106 which includes suitable coils of a small electromagnetic device 108, commonly referred to as a force motor. The armature 106 cooperates with a core 110 and a coil in the armature is connected by suitable means to a process controller illustrated as a box in the drawing but understood to represent an electronic control instrument which provides a suitable milliamp signal indicating a condition of the process being controlled by the actuator.

From the foregoing, it can be seen that as an error signal is detected by the process controller 112 and transmitted to the armature 106 of force motor 108, the armature is caused to move towards or away from the core 110 which movement, in turn, moves lever 96 and changes the pressure applied to cell 164. This change in pressure changes the resistance of the cell which causes the speed control circuit to function, thus causing motor 16 to operate and the actuator output shaft to move. This movement of the shaft is then fed back through spring 102 to the lever 96 thus indicating that the error has been corrected. It should be understood that the illustration in FIG. 5 is quite schematic and various physical forms of the components and their connections may be employed and still fall within the scope of the basic idea.

FIG. 6 embodiment

It shall be recognized that the electrooptical amplification system of FIG. 4, together with FIG. 2, and the piezo resistive cell system of FIG. 5 are also suitable for controlling electrohydraulic modulating actuators which respond to milliamp signals. Such actuators generally use a force motor opposed by a feedback spring; and since the available force is quite small, the output is used to operate a very small pilot valve of the flapper or movable jet design. The pilot valve in turn operates a larger valve controlling the power fluid.

An example of such an actuator system is schematically illustrated in FIG. 6 to include a pump 120 providing pressurized fluid to a hydraulically movable actuator 122. The pressure of the fluid applied to the actuator is controlled by a bleed mechanism 124 having a valve outlet 126. As mentioned, in a typical electrohydraulic arrangement, the valve outlet 126 is controlled by a flapper element positioned by a force motor energized by a process control instrument having a small signal output. If desired, details of such a mechanism may be found in U.S. Patent 3,087,471. Any change in the mechanical work required to move the flapper valve element controlling valve output 126 results in an error in positioning. Efforts to minimize the required mechanical work result in designs which require very clean oil and require one or more amplification stages. This all adds cost and reduces reliability.

In accordance with a further aspect of this invention, the valve outlet 126 may be controlled by a force motor 128 of the desired size having an armature 130 including an extension arm 132 positioned over outlet 126. The coil in armature 130 is connected in a circuit with a cell 64 and a battery 129, so that the position of the armature is a function of the resistance of cell 64. As in FIG. 4, the resistance of cell 64 is proportional to the light output of lamp 70 energized by process controller 68. Instead of battery 129, an AC source together with the control elements 58 and 60 of FIG. 2 may be utilized.

By thus electrically amplifying the error signal, the pressure applied to actuator 122 may be controlled by a single large valve without having an error in positioning. The instability of multi-stage hydraulic amplification is eliminated and the need for super clean oil is eliminated.

As mentioned, the system of FIG. 5 may similarly be applied to an electrohydraulic actuator of the type shown in FIG. 6 by employing the cell 64 in a circuit with a motor for controlling valve outlet 126.

FIG. 7 embodiment

Figure 7:
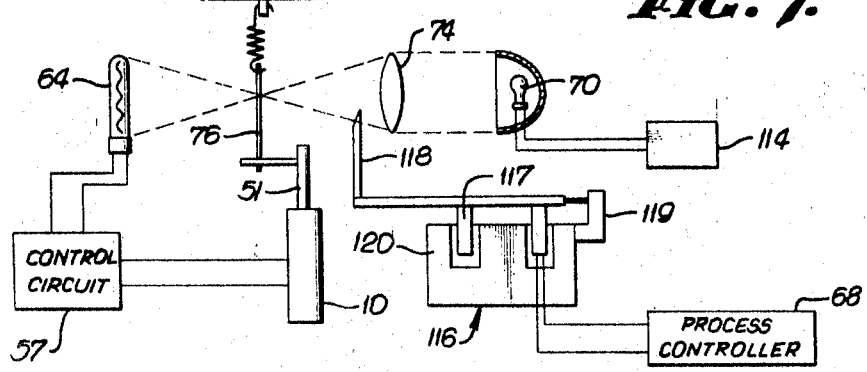
FIG. 7 is a diagram of another arrangement for varying the resistance in the control circuit.

In some instances, the arrangement illustrated in FIG. 4 may require a further modification in that the small signal provided by the process controller may be inadequate to properly energize the bulb 70 so as to obtain a true proportional representation of the variations in the signal. Accordingly, as a further aspect of the invention, there is provided a unique arrangement for controlling a stable light supply by the signal from such a process controller. As illustrated in FIG. 7, the lamp 70 is energized by a constant power supply 114 such as a conventional AC source rather than through the relatively weak signal of a process control instrument. The output from the lamp 70 is transmitted through a lens 74 onto a cell 64 as in FIG. 4, and the cell is in turn connected in the control circuit 57 illustrated as a box in FIG. 7 but understood to be comparable to the circuit shown in FIG. 2.

The circuit 57 similarly controls the operation of actuator 10 and its output shaft 51 which is connected to film 76 to control the amount of light striking cell 64. To vary the light striking cell 64 in accordance with a signal from a process controller, there is uniquely employed a small force motor 116 having an interrupter element 118 attached to its armature 117. The armature 117 may be mounted in suitable fashion by a small spring 119, for example, to the core 120 of the force motor 116 and the armature coil is, of course, connected to the process controller 68. With the foregoing described arrangement, it can be seen that as the signal provided by the process controller varies, the position of the interrupter element 118 is changed so that more or less light is allowed to strike the photo electric cell 64. Consequently, the signal from control 68 is effectively amplified.

The amplifying arrangement illustrated in FIG. 7 can also be employed to control the position of an electrohydraulic actuator of the type shown in FIG. 6 by connecting the force motor 128 to cell 64.

FIG. 8 embodiment

Figure 8:
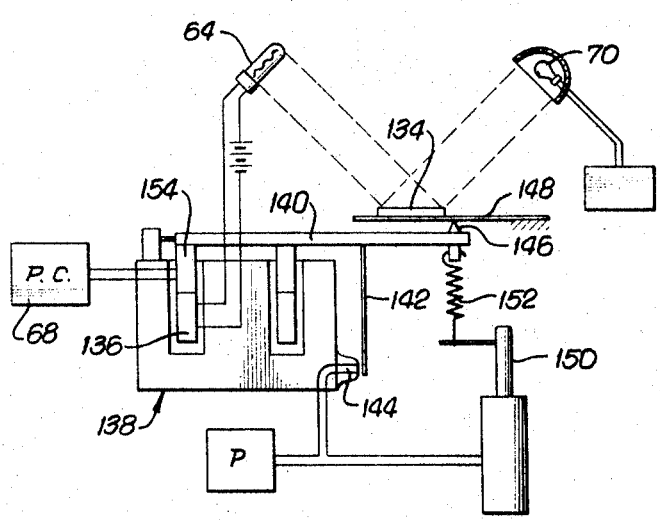
FIG. 8 shows another arrangement for varying the resistance in the control circuit for controlling operation of a hydraulic actuator.

Yet another arrangement for controlling a valve in a hydraulically operated actuator mechanism is illustrated in FIG. 8. As seen therein, a lamp 70 is energized by a constant source and the output of the lamp is directed onto a mirror 134 which reflects the light onto a photoconductive cell 64. The output of the cell is again connected in series with a coil 136 in the armature of a force motor 138. Also, similar to FIG. 6 an extension 140 to the armature carries a valve element 142 which controls the output of a bleed valve 144 connected to a hydraulically operated actuator mechanism similar to that in FIG. 6. The extension 140 further carries a pivot 146 which engages a member 148 carrying the mirror 134. Member 148 is mounted in a manner to be urged against the pivot 146. Thus, as the armature of the force motor is moved in accordance with the resistance of cell 64 the position of mirror 134 is adjusted thereby controlling the amount of light reflected onto cell 64 by the mirror. The position of the actuator output shaft 150 is fed back to the armature extension element 140 by means of a spring 152. To make this arrangement proportional to a signal, from a milliamp process controller and thus an amplification of such signal, a second smaller coil 154 is uniquely provided in the armature of the force motor and this smaller coil is energized by the signal from the process controller. Accordingly, the position of the mirror and thus the output of cell 64 and the position of the actuator shaft 150 are all a function of the amplified signal of the process controller.

From the foregoing it can be seen that a unique electromechanical actuator has been provided together with a variety of controlling mechanisms for such an actuator and for hydraulically operated actuators as well. As has been mentioned, the various arrangements illustrated are by way of example only and the exact structure employed to accomplish the desired results may be considerably varied to fit the given situation. Also, although several modifications and variations of the invention have been illustrated, it should be understood that other variations and modifications will come to the mind of one skilled in the art in view of the foregoing disclosures. Accordingly, it is intended that all such arrangements that fall within the scope of the invention be included in the appended claims.

What is claimed is:

1. An actuator mechanism comprising: a constant speed drive means; an axially fixed nut rotated in one direction by said drive means; a rotatable and axially movable actuator output shaft having an externally threaded portion threadably received in said nut, whereby said shaft is urged to move axially upon rotation of said nut; a spline shaft connected to rotate said output shaft while permitting axial movement of the output shaft; a variable speed drive means connected to rotate said spline shaft in the same direction as said nut, whereby said output shaft may be maintained in a given axial position by rotating the spline shaft at the same rate as said nut and moved in either axial direction by varying the speed of the variable speed drive means so that the spline shaft is rotated at a rate faster or slower than the rotational rate of said nut; a flywheel driven by one of said drive means through a friction clutch for moving said output shaft to one of its extreme positions upon deenergization of said drive means.

2. An actuator mechanism comprising a first drive means; an axially fixed member rotated in one direction by said drive means; a rotatable and axially movable actuator output shaft having a threaded portion threadably received by said axially fixed member whereby said shaft is urged to move axially upon rotation of said axially fixed member; a second shaft connected to rotate said output shaft while permitting axial movement of the output shaft; a second drive means connected to rotate said second shaft in the same direction as said axially fixed member whereby said output shaft may be maintained in a given axial position by rotating the second shaft at the same rate as said axially fixed member and move in either axial direction by varying the speed of one of said drive means so that the second shaft is rotated at a rate faster or slower than the rotational rate of said axially fixed member; a flywheel driven by one of said drive means through a friction clutch for moving said output shaft to one of its extreme positions upon deenergization of said drive means.

References Cited

UNITED STATES PATENTS

| | | |
|---|---|---|
| 2,054,760 | 9/1936 | Oberhoffken. |
| 2,520,014 | 8/1950 | Rehnberg et al. |
| 2,630,022 | 3/1953 | Terdina. |
| 2,860,266 | 11/1958 | Schrader. |
| 3,380,316 | 4/1968 | Wilkinson. |

LEONARD H. GERIN, Primary Examiner